(12) United States Patent
Sterenson et al.

(10) Patent No.: US 10,355,990 B2
(45) Date of Patent: Jul. 16, 2019

(54) ETHERNET RELAY

(71) Applicant: Sckipio Technologies S.I LTD, Ramat Gan (IL)

(72) Inventors: Ron Sterenson, Raanana (IL); Guy Reina, Givatayim (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 64 days.

(21) Appl. No.: 15/124,581

(22) PCT Filed: Mar. 10, 2015

(86) PCT No.: PCT/IL2015/050250
§ 371 (c)(1),
(2) Date: Sep. 8, 2016

(87) PCT Pub. No.: WO2015/136530
PCT Pub. Date: Sep. 17, 2015

(65) Prior Publication Data
US 2017/0111270 A1    Apr. 20, 2017

Related U.S. Application Data

(60) Provisional application No. 61/950,246, filed on Mar. 10, 2014.

(51) Int. Cl.
*H04L 12/891* (2013.01)
*G06F 13/14* (2006.01)
(Continued)

(52) U.S. Cl.
CPC .............. *H04L 45/66* (2013.01); *H04L 12/00* (2013.01); *H04L 12/2869* (2013.01);
(Continued)

(58) Field of Classification Search
None
See application file for complete search history.

(56) References Cited

U.S. PATENT DOCUMENTS 8,325,844 B2 *   12/2012   Walton ................ H04B 7/0417
                                                375/130
2003/0172220 A1 *   9/2003   Hao ........................ H04L 43/16
                                                710/305

(Continued)

FOREIGN PATENT DOCUMENTS

EP       2056548 A1    5/2009
WO       199825382 A2  6/1998

OTHER PUBLICATIONS

Extended European Search Report dated Aug. 7, 2017 for European Application No. 15760889.4 (9 Pages).
(Continued)

*Primary Examiner* — Duc T Duong
(74) *Attorney, Agent, or Firm* — Brown Rudnick LLP

(57) ABSTRACT

A multi-port access node, for communicating data to-and-fro a plurality of transceiver units via a plurality of respective communication lines, comprising: a plurality of processors, each processor includes a main communication unit that includes a network-side port, said processor includes at least one line-side port associated with a respective one of said communication lines, at least one of said processors further includes a relay unit having a relay port, said relay unit Is coupled with said main communication unit of the same said processor, said relay port is coupled with at least one of said network-side port of at least one different said processor, wherein said relay unit is configured to relay at least part of said data in at least one of a downstream direction destined toward at least one of said transceiver units, and an upstream direction arriving from at least one of said transceiver units.

24 Claims, 11 Drawing Sheets

(51) Int. Cl.
  *H04J 14/02* (2006.01)
  *H04L 12/721* (2013.01)
  *H04L 12/00* (2006.01)
  *H04L 12/413* (2006.01)
  *H04L 12/46* (2006.01)
  *H04L 12/761* (2013.01)
  *H04L 12/28* (2006.01)
  *H04B 10/272* (2013.01)
  *H04L 12/933* (2013.01)
  *H04L 12/931* (2013.01)
  *H04L 12/947* (2013.01)

(52) U.S. Cl.
  CPC ........ H04L 12/2892 (2013.01); H04L 12/413 (2013.01); H04L 12/4641 (2013.01); H04L 45/16 (2013.01); *H04B 10/272* (2013.01); *H04L 49/15* (2013.01); *H04L 49/25* (2013.01); *H04L 49/35* (2013.01)

(56) References Cited

U.S. PATENT DOCUMENTS

| | | |
|---|---|---|
| 2005/0276283 A1 | 12/2005 | Gyselings et al. |
| 2008/0025724 A1* | 1/2008 | Ozaki ................ H04Q 11/0067 398/68 |
| 2009/0067840 A1* | 3/2009 | Bernard .............. H04J 14/0226 398/67 |
| 2009/0238567 A1 | 9/2009 | Miller et al. |
| 2010/0067908 A1 | 3/2010 | Weitz et al. |
| 2010/0098414 A1 | 4/2010 | Kramer et al. |
| 2010/0232794 A1* | 9/2010 | Zheng ................... H04J 3/1694 398/68 |
| 2010/0278180 A1 | 11/2010 | Ma |
| 2011/0110409 A1* | 5/2011 | Sands ................... H04B 3/487 375/222 |
| 2011/0262132 A1 | 10/2011 | Grindley et al. |
| 2012/0147932 A1 | 6/2012 | Wilkes et al. |
| 2013/0089328 A1 | 4/2013 | Davis et al. |
| 2013/0230324 A1 | 9/2013 | Gupta |
| 2015/0180753 A1* | 6/2015 | Wei ..................... H04L 43/0811 370/242 |

OTHER PUBLICATIONS

International Search Report and Written Opinion of the International Searching Authority dated Jul. 12, 2015 for International Application No. PCT/IL2015/050250 (11 Pages).

* cited by examiner

ETHERNET RELAY

FIELD OF THE DISCLOSED TECHNIQUE

The disclosed technique relates to communication systems in general and to multi-port distribution points (DPs), in particular.

BACKGROUND OF THE DISCLOSED TECHNIQUE

A typical configuration for a multi-port distribution point (DP) is illustrated in the FIG. 1, which is a schematic block diagram of a typical configuration of a prior art multi-port distribution point, generally referenced 10. In such a configuration, data coming from the network side is terminated at an optical network termination (ONT) 12 and distributed to the subscribers (not shown) on the subscriber-side of the network through a switch hierarchy composed of an external switch 14 (G.999.1 Switch in FIG. 1) and an internal switch within the multi-port distribution point unit (DPU) i.e., chips $16_1$, $16_2$, $16_3$, and $16_4$ (4-DFE in FIG. 1). ONT 12 ally has only a single user network interface (UNI) to service the multiple subscriber ports. On the other hand, a DP may support a varying number of subscribers and consequently requires a scalable architecture that use multiple DPU chips to connect to the multiple subscriber lines. To connect a single ONT containing a single UNI port to multiple DPU chips requires a switch component that can switch the data stream to the respective DPU chip. The probler with this architecture is the switch component not only drives up the cost of the DPU but also the power-consumption.

To simplify the problem of switching traffic within a multi-port DPU chip, the ITU-T G.999.1 (or G.int) is used. This ITU-T (The International Telecommunication Union Telecommunication Standardization Sector) recommendation, originally specified as a framing sub-layer and interface specification to be used between digital subscriber line (DSL) and PHY layer transceivers (physical layer device), simplifies the switching logic by encoding the subscriber line port into the G.999.1 frame header. This allows for very simple switching logic that can easily be implemented in hardware. In addition, each subscriber line can run at a different physical layer rate. The G.999.1 recommendation also supports a data flow-control (DFC) ("backpressure") mechanism that extends the normal Ethernet "PAUSE" flow-control scheme by allowing flow-control to be applied to the traffic destined to a single subscriber line rather than to all traffic as is implemented by Ethernet flow-control.

Given that the cost and power of a switch is directly related to the number of switch ports it supports and the speed of each port and in addition, within a DP each DPU chip needs to be fed by a high-speed (multi-gigabit) data link in order to support the gigabit traffic rates to each subscriber; one of the problems to be solved is low to feed multiple subscriber lines with data traffic sourced from a single ONT UNI port without requiring expensive/power-consuming switching.

SUMMARY DFE THE PRESENT DISCLOSED TECHNIQUE

It is an object of the disclosed technique to provide a novel multi-port access node in which multiple distribution point unit (DPU) processors are configured and operative in a cascade (chain) configuration in order to eliminate the need for a network switch in the DPU or at least to reduce the switch port density. In accordance with the disclosed technique, there is thus provided a multi-port access node for communicating data to-and-fro a plurality of transceiver units via a plurality of respective communication lines. The multi-port access node includes a plurality of processors, where each processor includes a main communication unit. The main communication unit includes a network-side port. The processor includes at least one line-side port associated with a respective one of the communication lines. At least one of the processors further includes a relay unit having a relay port. The relay port is coupled with the main communication unit of the same processor. The relay port is further coupled with at least one of the network-side port of at least one different processor. The relay unit is configured to relay at least part of the data in at least one of a downstream direction destined toward at least one of the transceiver units, and an upstream direction arriving from, at least one of the transceiver units.

BRIEF DESCRIPTION OF THE DRAWINGS

The disclosed technique will be understood and appreciated more fully from the following detailed description taken in conjunction with the drawings in which.

DETAILED DESCRIPTION OF PREFERRED EMBODIMENTS

Figure 1:
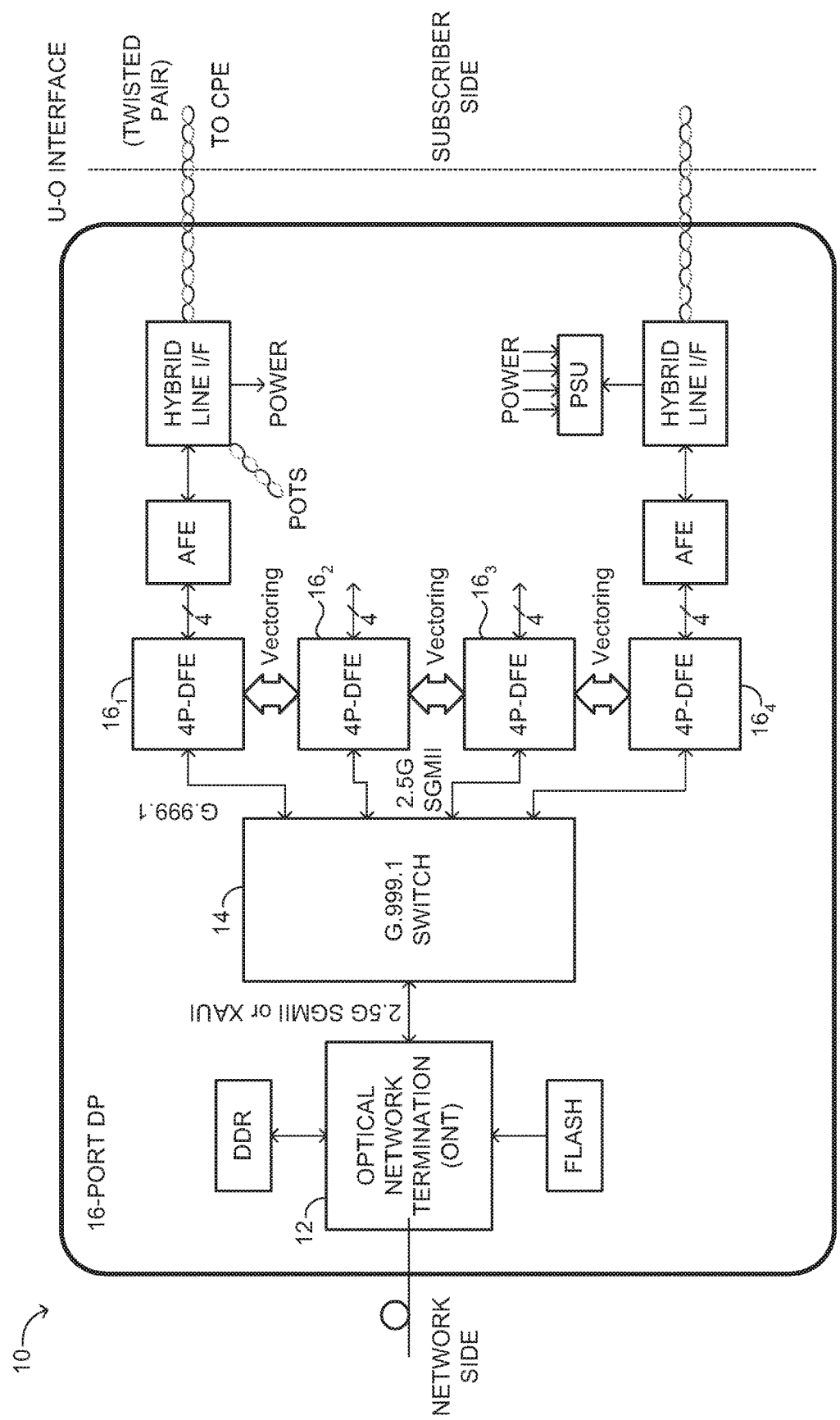
FIG. 1 is a schematic block diagram of a typical configuration of a prior art multi-port distribution point (DP)

The disclosed technique overcomes the disadvantages of the prior by providing a multi-port access node (e.g., a distribution point (DP)) for communicating data to-and-fro a plurality of transceiver units (e.g., customer premises equipment (CPE) units) via a plurality of respective communication lines. The multi-port access node includes a plurality of processors, where each processor includes a main communication unit. The main communication unit includes a network-side port. The processor includes at least one line-side port associated with a respective one of communication lines. At least one of the processors (typically a plurality thereof) further includes a relay unit having a relay port. The relay unit is coupled with the main communication unit of the same processor. The relay port is coupled with at least one network-side port of at least one different processor. The relay unit is configured to relay at least part of the data in at least one of: a downstream direction destined toward at least one of the transceiver units, and an upstream direction arriving from at least one of the transceiver units. The disclosed technique presents a solution that is low-cost and low power and is able to scale easily to support different numbers of subscriber lines without significantly increasing the cost and complexity of the distribution point unit (DPU) processor. The proposed solution of the disclosed technique allows the use of a low cost/low power/low port density switch for a DP that supports a large number of subscribers or even allows the elimination of the switch altogether in DPs supporting a smaller number of subscribers (e.g., up to 16). The problem to be solved was to conceive, design, and construct, a solution (hereby disclosed) that is configured and operative to be low-cost and low-power, as well as scalable and transparent as far as an external host is concerned.

The terms "chip", and "processor", in singular or plural are interchangeable and refer herein to at least one of an integrated circuit (IC), a monolithic integrated circuit, a central processing unit (CPU), a multi-core processing unit, a set of electronic within a mutual housing, and the like, that are configured to execute instructions (i.e., program, code, algorithm, etc.). The terms "downstream" and "downstream direction" are interchangeable throughout the Detailed Description and the Claims, and refer to data that is communicated from a network service provider (e.g., a distribution point) toward a customer, subscriber, or end user (e.g., customer premises equipment (CPE)). The terms "upstream" "upstream direction" are interchangeable throughout the Detailed Description and the Claims, and refer to data that is communicated from the customer, subscriber, or end user (CPE) toward the network service provider.

The proposed solution of the disclosed technique allows for multiple DPU chips to be operationally cascaded together into a chain in order to eliminate the need for a network switch in the DPU or at least to reduce the switch port density. This cascade or chain of DPU chips appears to the connected external host (or switch) as if they were a single DPU chip supporting a larger number of subscriber ports. The number of subscriber line ports supported by the single DPU chip, when connected in a chain, is exactly the number of ports supported by a single chip multiplied by the number of hips in the chain. The solution is completely transparent to the external host and also transparently supports G.999.1.

Figure 2:
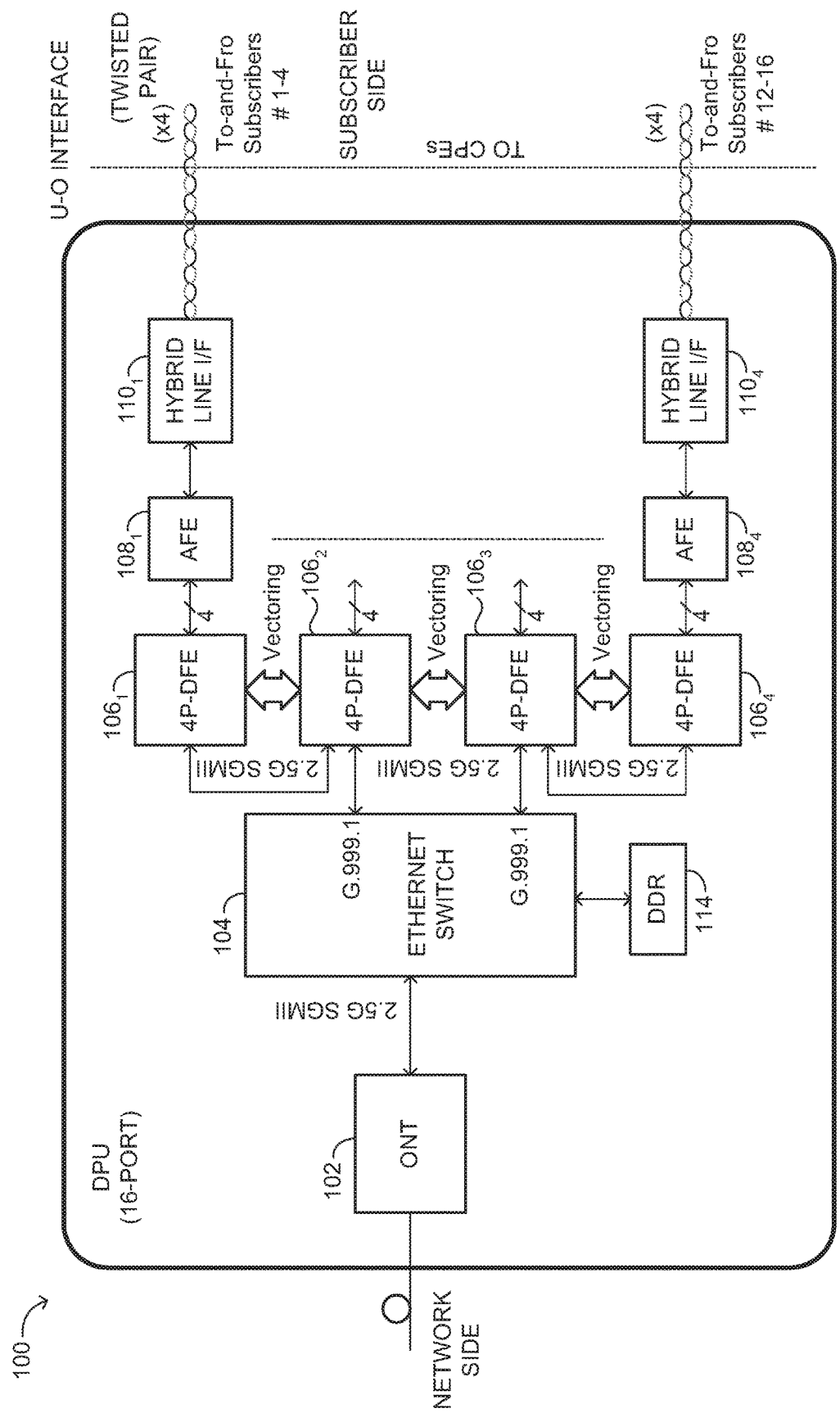
FIG. 2 is a schematic block diagram illustrating an example application of the solution where two DPU chips are cascaded together to provide a "virtual" 8-port DPU chip, constructed and operative according to an embodiment of the disclosed technique.

Reference is now made to FIG. 2, which is a schematic block diagram illustrating an example application of the solution where two DPU chips are, cascaded together to provide a "virtual" 8-port DPU chip, constructed and operative according to an embodiment of the disclosed technique. In this example configuration shown in FIG. 2, a 16-port DPU is implemented using a switch with only 2 switch ports connected to DPU chips. FIG. 2 shows a DPU 100 that includes an optical network terminal (ONT) 102 (also termed "optical network termination") an Ethernet switch 104, four multi port digital front end (DFE) processors $106_1$, $106_2$, $106_3$, and $106_4$, four analog front end (AFE) units $108_1$, $108_2$, $108_3$, and $108_4$, four hybrid line interfaces (I/Fs) $110_1$, $110_2$, $110_3$, and $100_4$, and a random access memory (RAM) device 112 (denoted in FIG. 3 as "DDR"). DPU 100 includes a network side, and a subscriber side. The network side couples with an Internet service provider (ISP) via a central office (CO), through ONT 102 (via fiber optic link). The subscriber side couples with (typically a plurality of) transceiver units, also termed herein "customer-premises equipment" (or "customer-provided equipment") (CPE) units (not shown) via respective communication lines that may typically be embodied in the form of twisted pairs (e.g., copper wires). FIG. 2 shows an example of a 16-port DPU 100, signifying that there may be up to 16 CPE units coupled with the subscriber side of DPU 100 via 16 communication lines (e.g., twisted pairs). Alternatively and analogously, DPU 100 may have variably different number of ports for example, 8, or 32, etc.

ONT 102 is coupled with Ethernet switch 104, as shown in FIG. 2. Alternatively, ONT 102 is coupled with at least one of multi-port DFE processors $106_1$, $106_2$, $106_3$, and $106_4$, (as will be described in another embodiment of the disclosed technique, shown in FIG. 4). In the particular embodiment shown in FIG. 2. Ethernet switch 104 coupled with two multi-port DFE processors, namely, $106_2$, $106_3$. Multi-port DFE processor $106_1$ is coupled with multi-port DFE processor $106_2$, and multi-port DFE processor $106_3$ is coupled with multi-port DFE processor $106_4$. In addition, multi-port DFE processors $106_1$, $106_2$, $106_3$, $106_4$ exchange with each other precoding data used for vectoring via the vectoring bus (that may be implemented as a mesh network between processors) (denoted by wide double-sided arrows). Vectoring generally refers to techniques of crosstalk cancellation through the precoding of data the DPU prior to its transmission to the CPEs (i.e., the subscriber, receivers' side). In general, the precoding of data typically involves the elimination of the off-diagonal elements in a channel matrix that represents the communication channels' responses for a given frequency. The main diagonal of this channel matrix relates to the direct channel (lines) that couple between transmitters and receivers, whereas the off-diagonal elements in the channel matrix represent the cross-talk channels.

FIG. 2 illustrates that each multi-port DFE processor includes four line-side ports that are coupled with its respective AFE. In particular, multi-port DFE processor $106_1$ is coupled with AFE $108_1$, multi-port DFE processor $106_2$ is coupled with AFE $108_2$, multi-port DFE processor $106_3$ is coupled with AFE $108_3$, and multi port DFE processor $106_4$ is coupled with AFE $108_4$. Each AFE is further coupled with its respective hybrid line I/F. In particular, AFE $108_1$ coupled with hybrid line I/F $110_1$, AFE $108_2$ (not shown) is coupled with hybrid line I/F $110_2$ (not shown) AFE $108_3$ (not shown) is coupled with hybrid line I/F $110_3$ (not shown), and AFE $108_4$ is coupled with hybrid line I/F $110_4$. Each hybrid line I/Fs are coupled with the CPEs at the subscriber side via at least one (typically a plurality of) communication channel(s) (e.g., twisted pair(s)), as depicted in FIG. 2.

Figure 3:
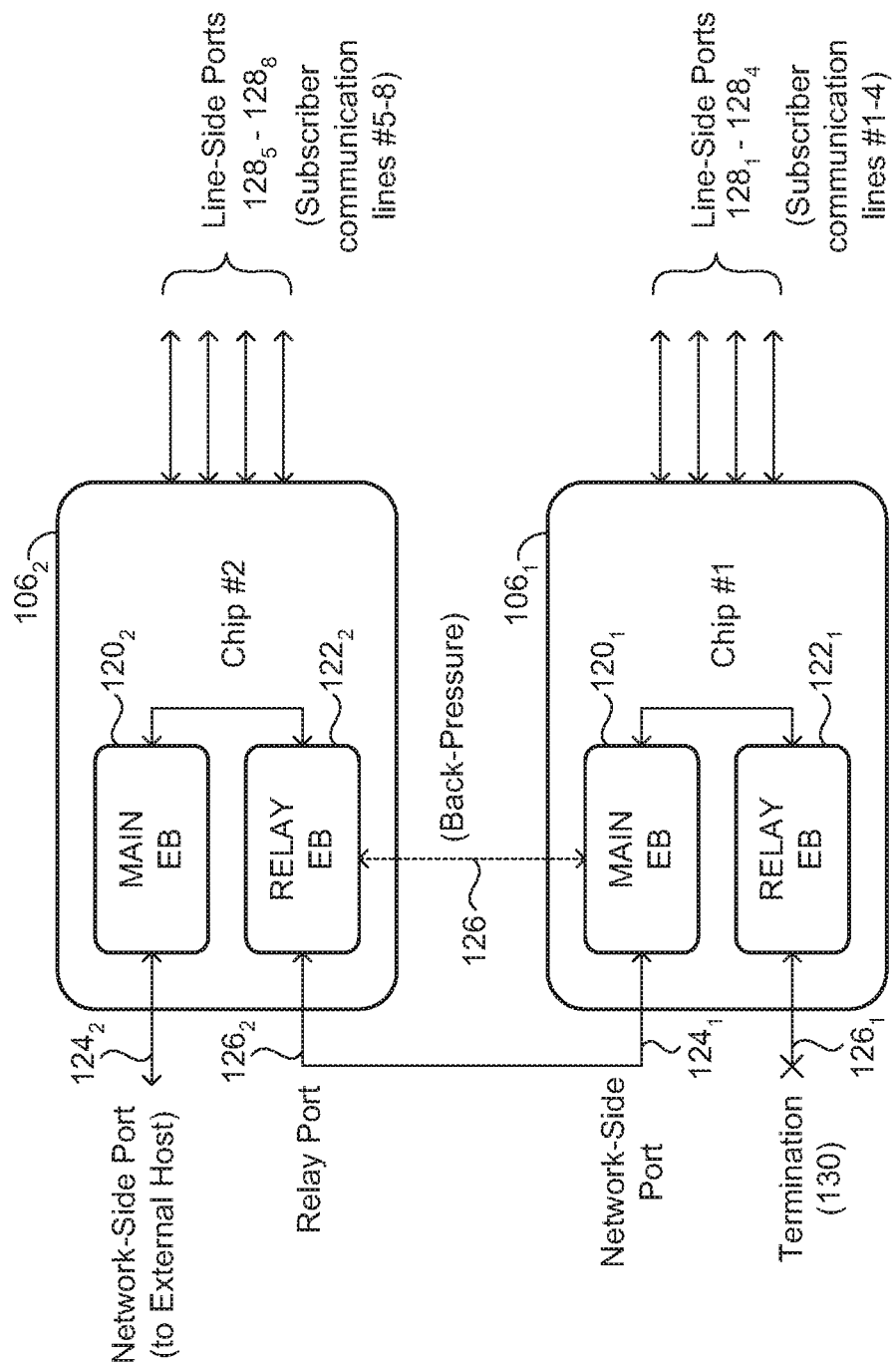
FIG. 3 is a schematic illustration that shows the connection of two DPU chips into a chain supporting twice the number of subscriber line ports, constructed and operative in accordance with embodiments of the disclosed technique.

To further elucidate the internal structure, configuration and operation of multi-port DFE processors $106_1$, $106_2$, $106_3$, and $106_4$, reference in now further made to FIG. 3, which is a schematic illustration that shows the connection of two DPU chips into a chain supporting twice the number of subscriber line ports, constructed and operative in accordance with embodiments of the disclosed technique. Each multi-port DFE processor includes a main communication unit, also termed herein "main Ethernet block" ("main EB", or "main communication unit"), and a plurality of line-side ports. Each main EB includes a network-side port. FIG. 3 illustrates two multi-port DFE processors $106_1$ and $106_2$, each having it respective main EB (i.e., main EB $120_1$ in multi-port DFE processor $106_1$ and main EB $120_2$ in multi-port DFE processor $106_2$), and a plurality of line-side ports $128_1$, $128_2$, $128_3$, $128_4$ (of multi-port DFE processor $106_1$), $128_5$, $128_6$, $128_7$, $128_8$, (of multi-port DFE processor $106_2$). Main EB $120_1$ includes a network-side port $124_1$, and main EB $120_2$ includes a network-side port $124_2$. Furthermore, at least one of multi-port DFE processors $106_1$, $106_2$, $106_3$, and $106_4$ (FIG. 2) includes a relay unit, also termed herein "relay Ethernet block" ("relay EB" "relay communication unit"). In the configuration shown in FIG. 3, each one of multi-port DFE processors $106_1$ and $106_2$ includes its respective relay EB (i.e., multi-port DFE processor $106_1$ includes a relay EB $122_1$ and multi-port DFE processor $106_2$ includes a relay EB $122_2$). Each relay EB has its respective relay port. In particular, relay EB $122_2$ includes a relay port $126_2$, and relay EB $122_1$ includes a relay port $126_1$ (which is not used as will be described hereinbelow). The main EBs and relay EBs within each (of the same) multi-port DFE processor are coupled with each other. In particular, and as shown in FIG. 3, within multi-port DFE processor $106_1$ main EB $120_1$ and relay EB $122_1$ are coupled together. In multi-port DFE processor $106_2$ main EB $120_2$ and relay EB $122_2$ are coupled together. Further coupled together, are the relay EB of one multi-port DFE processor with, the main EB of at least another (different) multi-port DFE processor to as to form a relay chain configuration. Specifically, relay EB $122_2$ of multi-port DFE processor $106_2$ is coupled with main EB $120_1$ of multi-port DFE processor $106_1$. FIG. 2 shows two cascaded relay configurations (or relay chain configurations). Specifically, the first cascaded relay configuration is formed by the cascaded coupling between multi-port DFE processor $106_1$ and multi-port DFE processor $106_2$. The second cascaded relay configuration is formed by the cascaded coupling between multi-port DFE processor $106_3$ and multi-port DFE processor $106_4$.

FIG. 3 stows the flow of data between the main and relay EBs and the external connection between relay and main ports. Moreover, FIG. 3 shows the termination of the chain and the dropping of data packets not targeted to any of the subscriber ports at an X termination point 130. FIG. 3 is representative to the interconnections (i.e., internal as well as external couplings) between a pair of multi-port DFE processors, namely $106_1$ and $106_2$ with Ethernet switch 104 as shown in FIG. 2. Similarly, this configuration also applies to other pairs of multi-port DFE processors, namely, $106_3$ and $106_4$, as shown in FIG. 2.

In the downstream direction, the relay unit (e.g., relay EB $112_2$) is configured and operative to relay at least part of the data that is destined to at least one of the CPEs, via respective subscriber communication lines. For example, suppose Ethernet switch 104 receives data from the network side that is destined to a subscriber (CPE) number 3 (not shown) via line-side port $128_3$. That subscriber is coupled with DPU 102 via subscriber communication line number 3. Ethernet switch 104 directs the data to multi-port DFE processor $106_2$, which receives the data through its main EB $120_2$. Main EB $120_2$ relays this data to relay EB $122_2$, which in turn relays the data to main EB $120_1$ of multi-port DFE processor $106_1$. Main EB $120_1$ directs the data to the destined subscriber (CPE number 3) line-side port $128_3$ and subscriber communication line number 3. According to one mode of operation, data is exclusively destined to a particular receiver (CPE); in this case the data is relayed (e.g., routed) solely and entirely toward its intended recipient (i.e., via at least one of the multi-port DFE processors). According to another mode of operation, different parts of the data are destined to different receivers (CPEs); in this case the data is disseminated (distributed) according to respective intended recipient. Data that has traversed through the entire relay chain configuration and is found not destined to any of the subscribers dropped off (i.e., discarded) by relay EB $122_1$ (indicated by termination 130).

In the upstream direction the relay unit (e.g., relay unit $122_1$) configured and operative to relay at least part of the data arriving from at least one of the transceiver units (CPEs) to the network side (network service provider). For example, suppose multi-port processor DFE $106_1$ receives data from CPE number 3 that is destined toward the network service provider Main EB $120_1$ relays (i.e., communicates, transmits) this data or at least part thereof from main EB $120_1$ to relay EB $122_2$ of multi port DFE processor $106_2$. Relay $122_2$ relays this data or at least part thereof to main EB $120_2$, which in turn relays the data toward the network side. According to one mode of operation, only the data from a particular CPE is relayed toward the network side (i.e., through at least one of the multi-port DFE processors). According to another mode of operation, data is aggregated from multiple CPEs as it traverses or propagates by being relayed through successive multi-port DFE processors of the chain toward the network side. For example, suppose at a particular time interval, there is data destined to card the network side from both CPE number 2 (via subscriber communication line number 2) and CPE number (via subscriber communication line number 7). Data from CPE number 2 is relayed from multi-port DFE processor $106_1$ toward multi-port DFE processor $106_2$ (through the link between main EB $120_1$ and relay EB $122_2$) whereupon it is aggregated with data from CPE number 7 (by multi-port DFE processor $106_2$) and transmitted toward the network side via main EB $120_2$.

The disclosed technique is further configured and operative to provide a data flow control (DFC) mechanism for preventing the occurrence of data congestion when data transmitted by the relay EBs overwhelm the main EBs receiving the data or at least a part thereof (representatively illustrated by dotted arrow 126 in FIG. 3). This mechanism is realized by the main EB, which transmits a signal (i.e., also termed herein "back-pressure signal") that carries information to the relay EB pertaining to the capability of receiving further data (i.e., or alternatively, when no further data can be received). In the case where no further data can be received, the back-pressure signal may convey information to the transmitter (relay EB) to stop the data transmission until the receiver (main EB) indicates (i.e., via the back-pressure signal) that its ability to receive further data has been regained.

Figure 4:
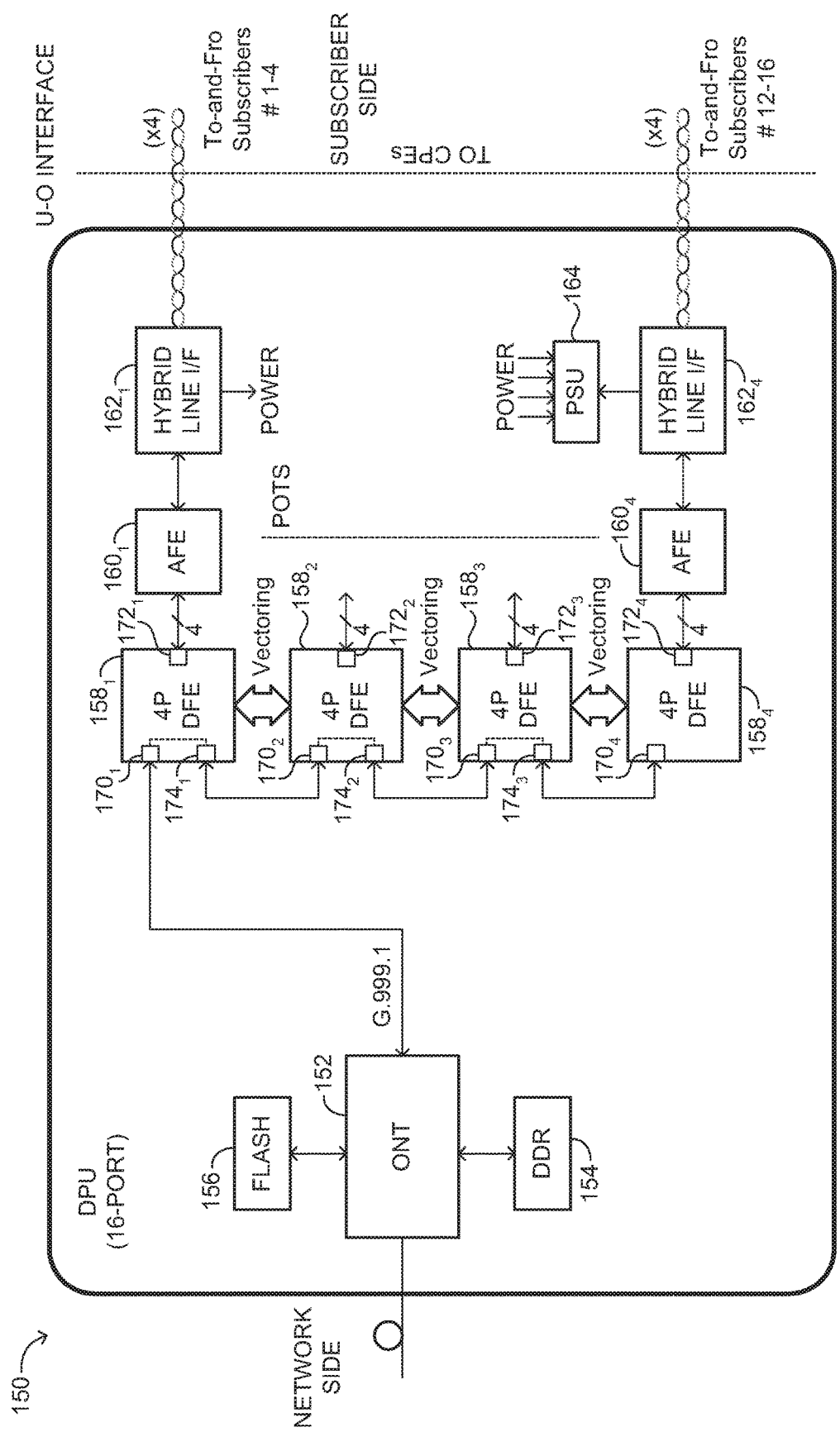
FIG. 4 is a schematic block diagram illustrating another embodiment, constructed and operative according to another embodiment of the disclosed technique.

According to another embodiment of the disclosed technique there is provided another alternative solution that is shown in FIG. 4, where a more inclusive implementation is demonstrated. Reference is now made to FIG. 4, which is a schematic block diagram illustrating another embodiment, generally referenced 150, constructed and operative according to another embodiment of the disclosed technique. According to this embodiment, Ethernet switch 104 (of FIG. 2) has been eliminated completely and a 16-port "virtual"

chip is implemented using a relay chain configuration (or "cascaded relay configuration") of 4×4-port DPU chips. The links forming this relay chain configuration are embodied (in part) by multi-port DFE processors that are linked in succession with each other so as to form the cascaded relay configuration. To implement this solution shown in FIG. 4, a second Ethernet port is added to the top (or "first") multi-port DFE chip in the cascaded relay configuration hierarchy. This and port is referred to (i.e., as in the previous embodiment), as a "relay port" (i.e., as distinct from the main ports used to connect to the external host). According to this relay chain configuration ("chain configuration" for brevity), the relay port of each chip is connected to the main port of the next chip in the chain (shown in FIG. 4, from top to bottom). In the last multi-port DFE chip in the chain, the relay port is terminated.

The configuration of DPU 150 shown in FIG. 4 includes an optical network terminal (ONT) 152, four multi-port digital front end (DFE) processors 158$_1$, 158$_2$, 158$_3$, and 158$_4$, four analog front end (AFE) units 160$_1$, 160$_2$ (not shown), 160$_3$ (not shown), and 160$_4$, four hybrid line interfaces (I/Fs) 162$_1$, 162$_2$ (not shown), 162$_3$ (not shown), and 162$_4$, a random access memory (RAM) device 154 (denoted in FIG. 4 as "DDR"), non-volatile memory device 156 (denoted in FIG. 4 as "Flash"), and a power supply unit (PSU) 164. DPU 150 includes network side, and a subscriber side. The network side couples with an Internet service provider (ISP) via a central office (CO), through ONT 102 (via fiber optic link). The subscriber side couples with (typically a plurality of) transceiver units, (CPE units— not shown) via respective communication lines that may typically be embodied in the form of twisted pairs (i.e., copper wires). Similarly to FIG. 2, FIG. 4 shows an example of a 16-port DPU 150, signifying that there may be up to 16 CPE units coupled with the subscriber side of DPU 150 via 16 communication lines (e.g., twisted pairs). Alternatively and analogously, DPU 150 may have a varying number of ports, for example, 8, 32, etc.

Each multi-port DFE processor 158$_1$, 158$_2$, 158$_3$ and 158$_4$ includes a main communication unit ("main EB"—as shown in FIG. 3), a respective network-side port 170$_1$, 170$_2$, 170$_3$, and 170$_4$ and respective line-side ports (denoted collectively for each respective processor) 172$_1$, 172$_2$, 172$_3$, and 172$_4$. At least one of multi-port DFE processors 158$_1$, 158$_2$, 158$_3$ and 158$_4$ includes a respective relay unit ("relay EB"—as shown in FIG. 3) that has a relay port. In the configuration shown in FIG. 4, three of the multi-port DFE processors 158$_1$, 158$_2$, 158$_3$ include respective relay ports 174$_1$, 174$_2$, 174$_3$. In each multi-port DFE processor, the main EB is coupled with its respective relay EB (where applicable). This coupling is represented in FIG. 4 by a dotted line within the (relevant) multi-port DFE processors. ONT 102 is coupled to network-side port 170$_1$ of a main EB (not shown) of multi-port DFE processor 158$_1$. The multi-port DFE processors in the present embodiment are, coupled together in sequence (succession) to form a chain configuration. In this chain configuration, multi-port DFE processor 158$_1$ (also referred to as the "first processor" or "first chip" in the chain configuration) is coupled with multi-port DFE processor, which in turn is coupled with multi-port DFE processor 158$_3$, which in turn is coupled with multi-port DFE processor 158$_4$. Specifically, the relay EB (not shown) of multi-port DFE processor 158$_1$ is coupled with the main EB (not shown) of multi-port DFE processor 158$_2$ via the connection between relay port 174$_1$ and network-side port 170$_2$. The next link in this chain configuration is realized in the coupling between the relay EB (not shown) of multi-port DFE processor 158$_2$ with the main EB (not shown) of multi-port DFE processor 158$_3$ via the connection between relay port 174$_2$ and network-side port 170$_3$. The final link in the chain configuration realized in the coupling between the relay EB (not shown) of multi-port DFE processor 158$_3$ with the main EB (not shown) of multi-port DFE processor 158$_4$ via the connection between relay port 174$_3$ and network-side port 170$_4$. Multi-port DFE processor 158$_4$ is designated the last chip (or last processor) in the relay chain configuration. Multi-port DFE processor 158$_1$ is designated the first chip (or first processor) in the relay chain configuration. Additionally, multi-port DFE processors 158$_1$, 158$_2$, 158$_3$, and 158$_4$ are configured and operative to exchange with each other precoding data used for vectoring (denoted by wide double-sided arrows).

In essence, the main communication units (main EBs) and relay units (relay EBs) of the multi-port DFE processors are configured and operative to relay at least part of the data in at least one of: a downstream direction that is destined toward at least one of the transceiver units (CPEs), and an upstream direction arriving (incoming) from at least one of the transceiver units. In the downstream direction, different parts of the relayed data may be relayed to different respective transceiver units. Specifically, the principle of operation for all chips (multi-port DFE processors) is as follows. In the downstream direction, traffic (i.e., data) entering the main communication port (e.g., 170$_1$) of a particular chip is destined either for a local subscriber port (i.e., network-side port) (e.g., toward subscribers 1 through 4) within that chip, or for a subscriber port located within another chip (e.g., toward subscribers 12 through 16) in the chain configuration. The forwarding logic in the downstream direction (i.e., from the external host, network service provider, CO, etc.) is as follows. All traffic to a local subscriber port is queued on a stream data-structure (queue) associated with, the respective local subscriber port. The remaining traffic that is not queued locally is "blindly" (e.g., indiscriminately) forwarded by the main EB to the next chip through the relay EB. Traffic that traverses the entire chair (e.g., sequence) of chips and is not destined for any of the subscriber ports is discarded by the last chip (i.e., multi-port DFE processor 158$_4$) in the chain configuration.

In the upstream direction (i.e., in the direction towards the external host) at least part of the data traffic entering the relay port from an adjacent chip (i.e., a different chip that either succeeds or precedes the subject chip within the cascaded chain configuration) is blindly forwarded by the relay EB to the main EB and output through the main communication pert toward the external host. The exception to this rule is in the handling of G.999.1 PAUSE frames. This will explained in greater detail herein below and is the subject of additional innovativeness of the disclosed technique. In general, and in accordance with another mode of operation, DPU 150 is configured and operative to aggregate data from multiple CPEs (subscribers) as it propagates by being relayed through successive chips of the chain configuration, toward the network side (external host).

Figure 5:
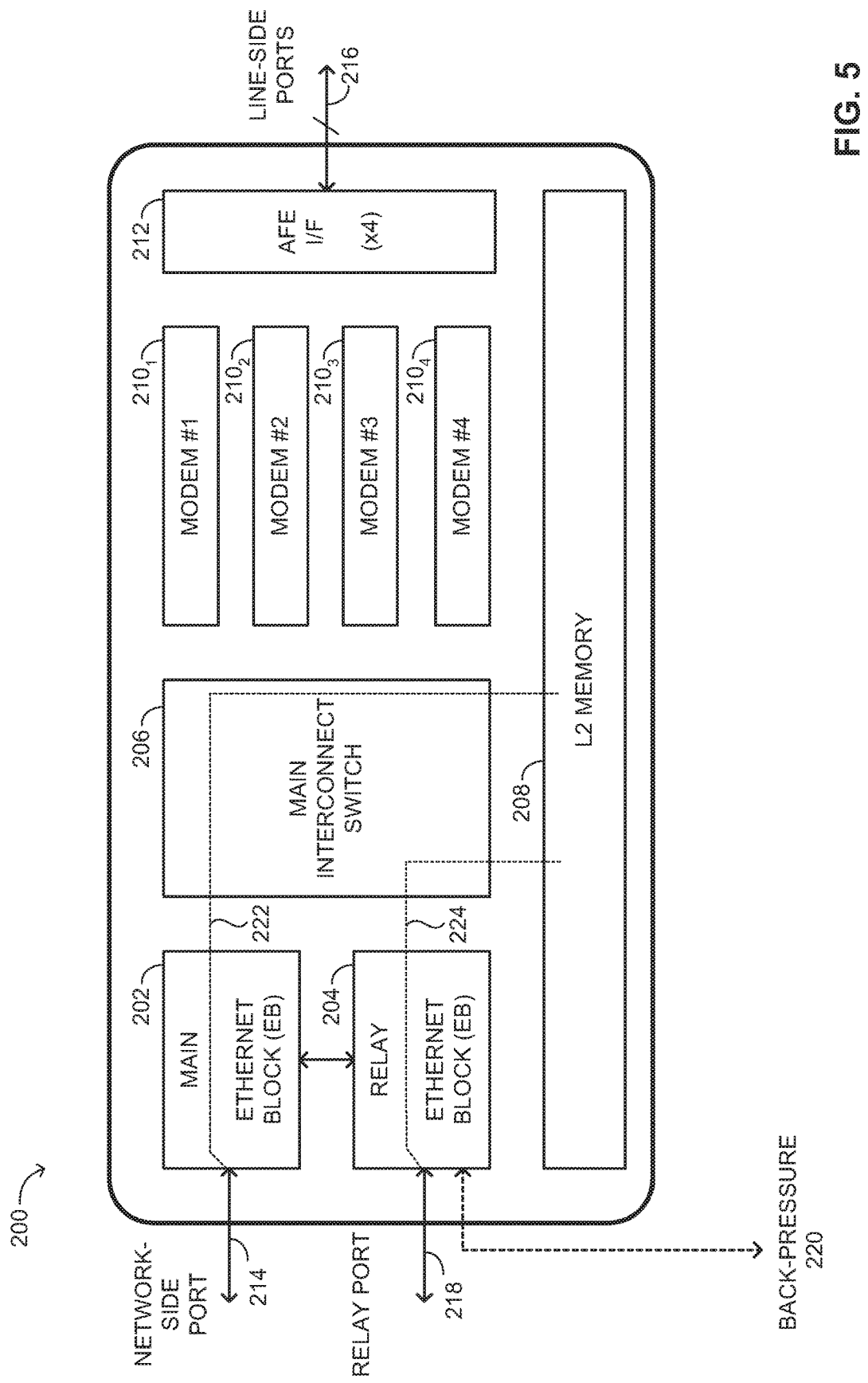
FIG. 5 is a schematic illustration showing the internal flow of data in the relay implementation, constructed and operative in accordance with embodiments of the disclosed technique.
Figure 6:
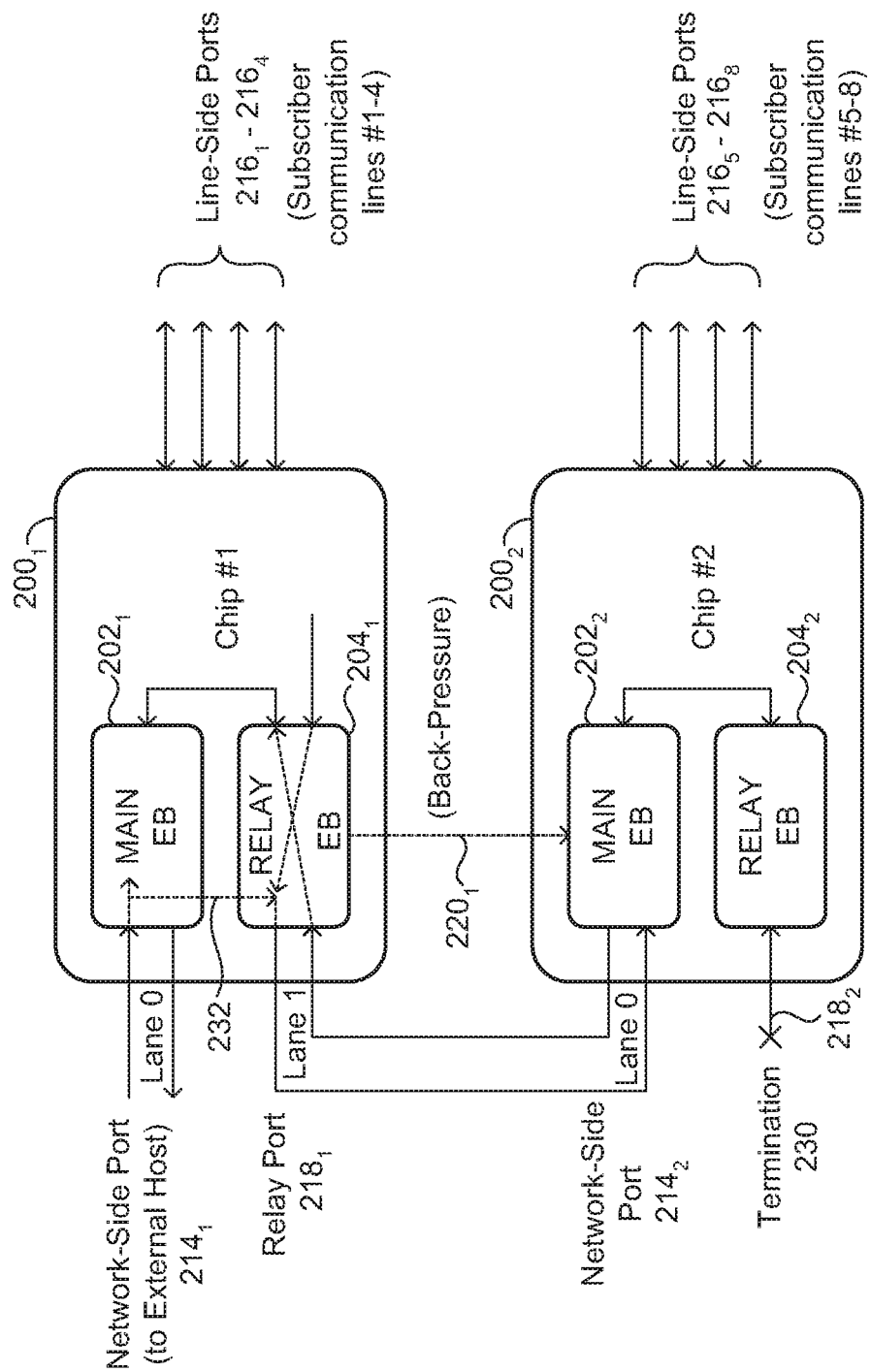
FIG. 6 is a schematic illustration showing the relay solution in a high-level diagram, constructed and operative in accordance with embodiments of the disclosed technique.

Reference is now further made to FIGS. 5 and 6. FIG. 5 is a schematic illustration showing, the internal flow of data in the relay implementation generally referenced 200, constructed and operative in accordance with embodiments of the disclosed technique. FIG. 6 is a schematic illustration showing the relay solution in a high-level diagram, constructed and operative in accordance with embodiments of the disclosed technique. FIG. 5 shows various typical components of a DP processor including a main Ethernet block (EB) 202, a relay EB 204, a main interconnect switch 206, a memory device 208, a plurality of modem devices 210$_1$, $210_2$, $210_3$, and $210_4$, and a plurality of AFE I/F units (collectively denoted 212). The DP processor includes a plurality of line-side ports 216. Main EB 202 includes a network-side port 214. Relay EB 204 includes a relay port 218. FIG. 5 shows the flow of data via paths 222 and 224) between main and relay Ethernet blocks (i.e., in both upstream and downstream directions) and the use of L2 (Level 2) memory 208 for temporary storage of data in the upstream direction. Bi-directional data flow path 222 represents the flow of data to-and-fro network-side port 214, main EB 202, main interconnect switch 206, and memory device 208. Likewise, bi-directional data flow path 224 represents the flow of data to-and-fro relay port 218, relay EB 204, main interconnect switch 286, and memory device 208. FIG. 5 further shows a back-pressure signal 220 transmitted from relay EB 204 toward other chips (not shown in FIG. 6) in the chain when congestion occurs in the upstream direction.

There are a number of possible implementations of the relay function that is described hereinabove in conjunction with FIGS. 4 and 5. In a naïve (i.e., simple) implementation, traffic in both the downstream and upstream directions is forwarded through L2 memory device 208, as shown in FIG. 5. This may incur some latency on the traffic as it passes through each chip (e.g., multi-port DFE processor). In this implementation, each chip inspects the traffic received on its main (network-side) port and forwards only that traffic that is not destined to one of its local ports. In another implementation, all chips in the chain effectively receive the downstream traffic at the same time by connecting an input physical coding sub-layer (PCS) lane of the main EB directly to an input PCS lane of the relay EB as described in conjunction with FIG. 6 (and in greater detail in conjunction with FIG. 7A). Basically, FIG. 6 illustrates two multi-port DFE processors $200_1$ and $200_2$ ("chip #1" and "chip #2", respectively) that are coupled with each other. Chip #1 includes a main EB $202_1$, a relay EB $204_1$, a network-side port $214_1$, a plurality of line-side ports $216_1$-$216_4$, and a relay port $218_2$. Chip #2 includes a main EB $202_2$, a relay EB $204_2$, a network-side port $214_2$, a plurality of line-side ports $216_6$-$216_8$, and a termination 230. Specifically, FIG. 6 shows a high-level diagram of the relay solution of the disclosed technique in which a PCS lane of main EB $202_1$ is connected 232 directly to an input PCS lane of relay EB $204_1$. FIG. 6 further shows two lanes, denoted "Lane 0" and "Lane 1" (of chip #1) and one lane denoted "Lane 0" (of chip #2). Each such lane includes transmission (TX) and reception (RX) communication routes (links, connections). Lane 1 of processor $200_1$ is coupled with Lane 0 of processor $200_2$, as shown in FIG. 6. In this case, instead of actively forwarding traffic not targeted for a local subscriber port, a chip simply allows traffic to enter the "main" EB if and only if it is targeted for a local subscriber port. Essentially, the main EB inspects the data received on its respective network-side port, and filters data not destined to its respective line-side ports. In other words, each chip filters out traffic not intended for it. This solution reduces the downstream latency compared to the alternative store-and-forward approach.

In the downstream direction, data from network-side port 214 to be relayed toward at least one of line-side ports $216_5$-$216_8$ enters main EB $202_1$ through Lane 0 and is conveyed to relay EB $204_1$ via connection 232. This data is then relayed by relay EB $204_1$ to main EB $202_2$ of Chip #2 via Lane 1. Chip #2 (i.e., $200_2$) inspects the data and forwards only the data destined for the respective line-side port(s) $216_5$-$216_8$. All other data is filtered out (i.e., dropped). In the upstream direction, data incoming from line-side ports $216_5$-$216_8$ that is destined toward the external host ($214_1$) enter Chip #2. Main EB $202_2$ of processor $200_2$ conveys this data is its respective Lane 0 toward Lane 1 of relay EB $204_1$ of processor $200_1$. Relay EB $204_1$ relays this data (shown via diagonal dotted line with arrow, therein, directed upwards from left to right) to main EB $202_1$, which in turn conveys this data toward network-side port $214_1$. DFC is achieved by the use of a back-pressure signal $220_1$ (also "back-pressure channel") between relay EB $204_1$ and main EB $202_2$, as shown in FIG. 6.

Figure 7A:
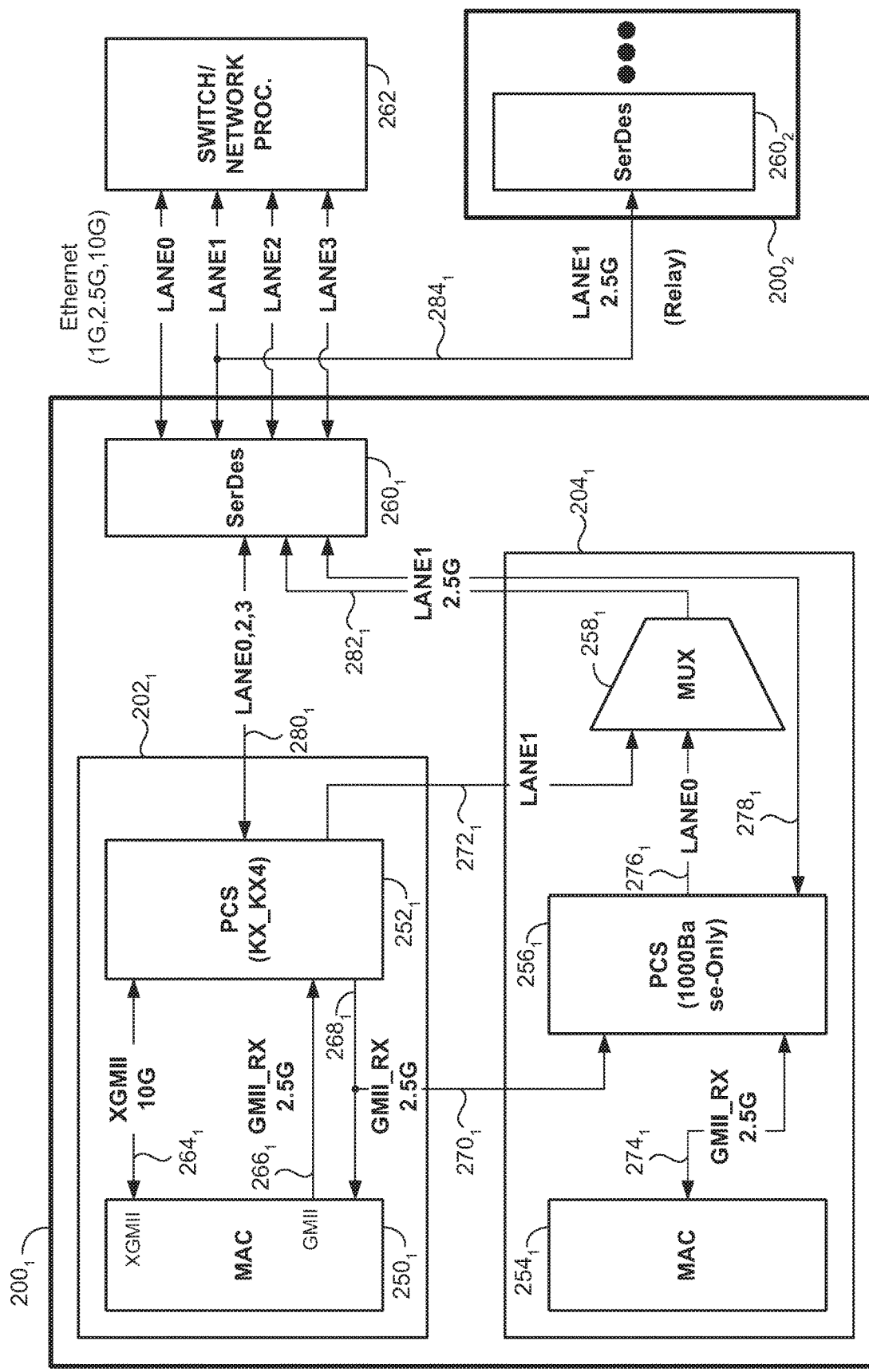
FIG. 7A a schematic diagram that shoves a practical implementation of the relay architecture, constructed and operative in accordance with embodiment f the disclosed technique.
Figure 7B:
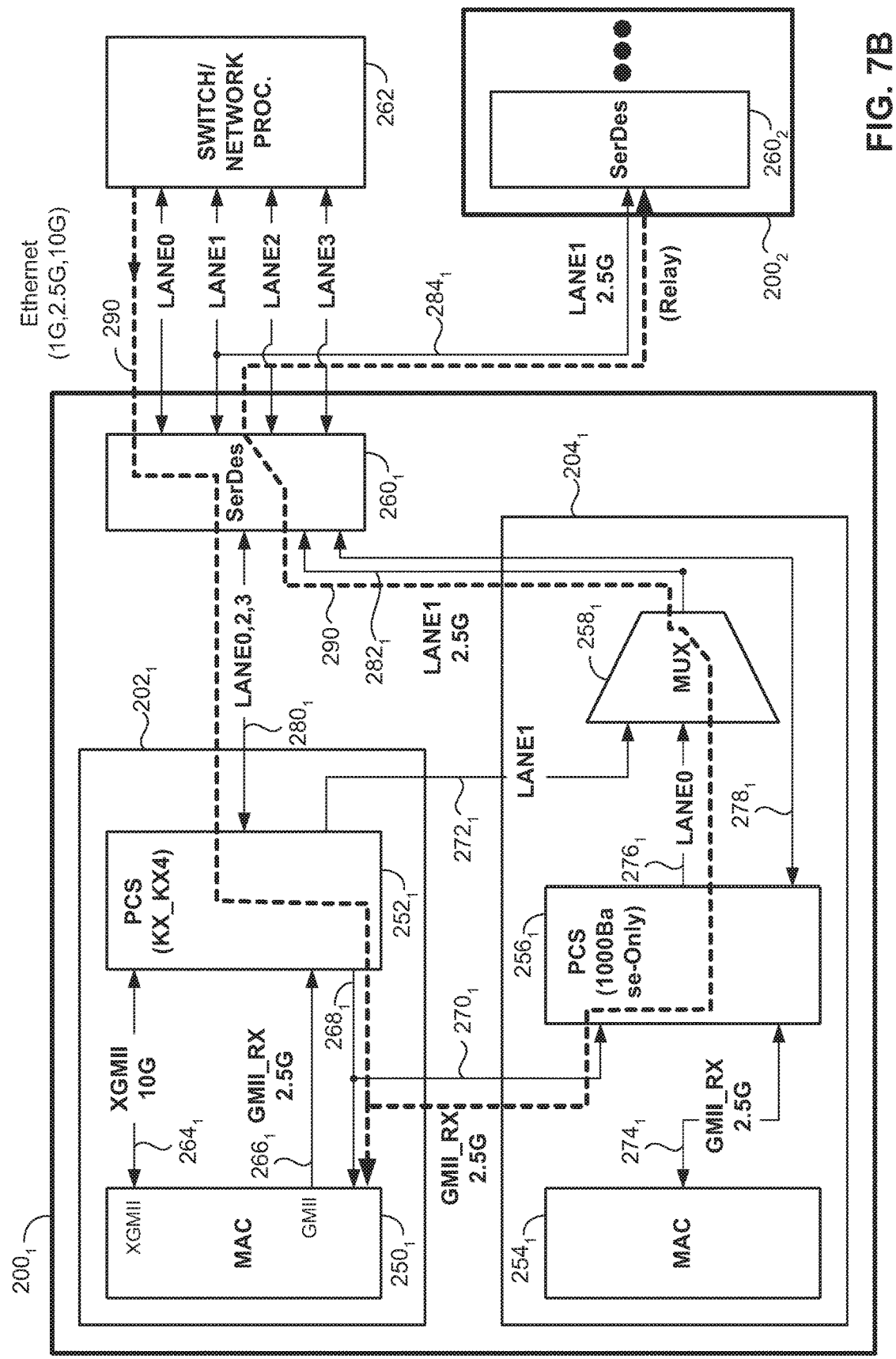
FIG. 7B is a schematic illustration of the relay architecture of FIG. 7A further showing a downstream data path toward the subscriber side.
Figure 7C:
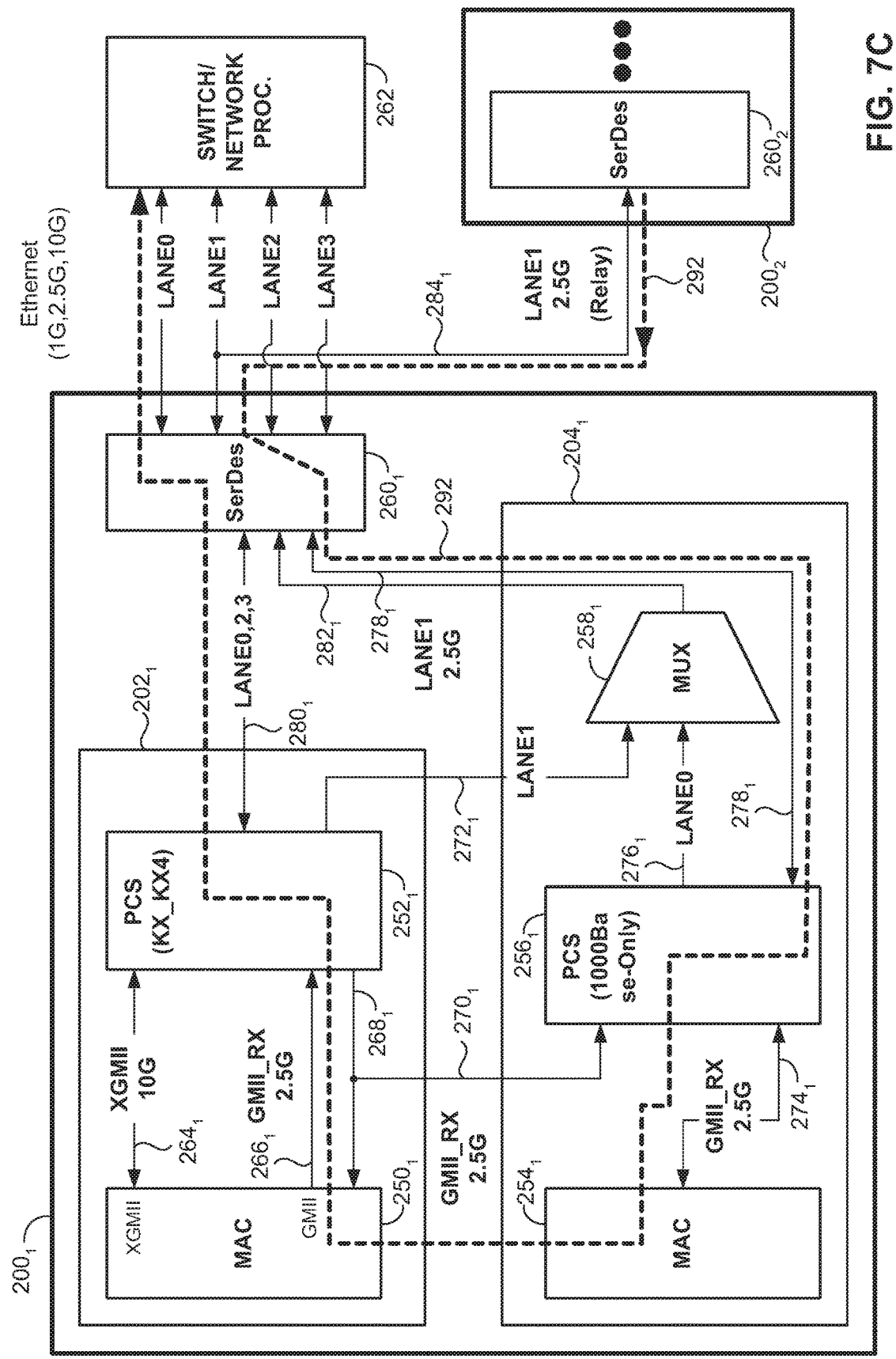
FIG. 7C is a schematic illustration of the relay architecture of FIG. 7A further showing an upstream data path toward the network side.
Figure 7D:
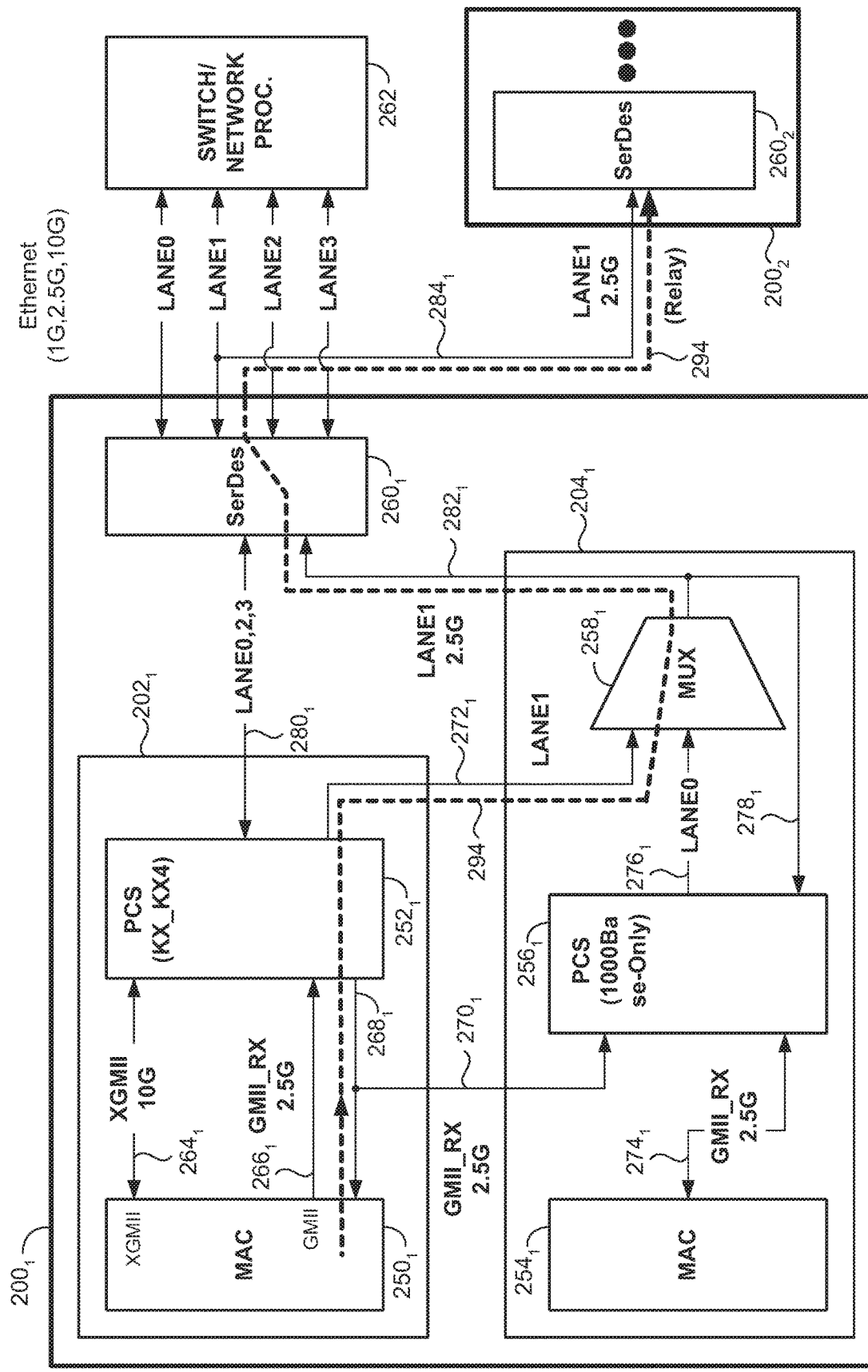
FIG. 7D is a schematic illustration of the relay architecture of FIG. 7A further showing a data path, typically used for communicating management data between processors.
Figure 8:
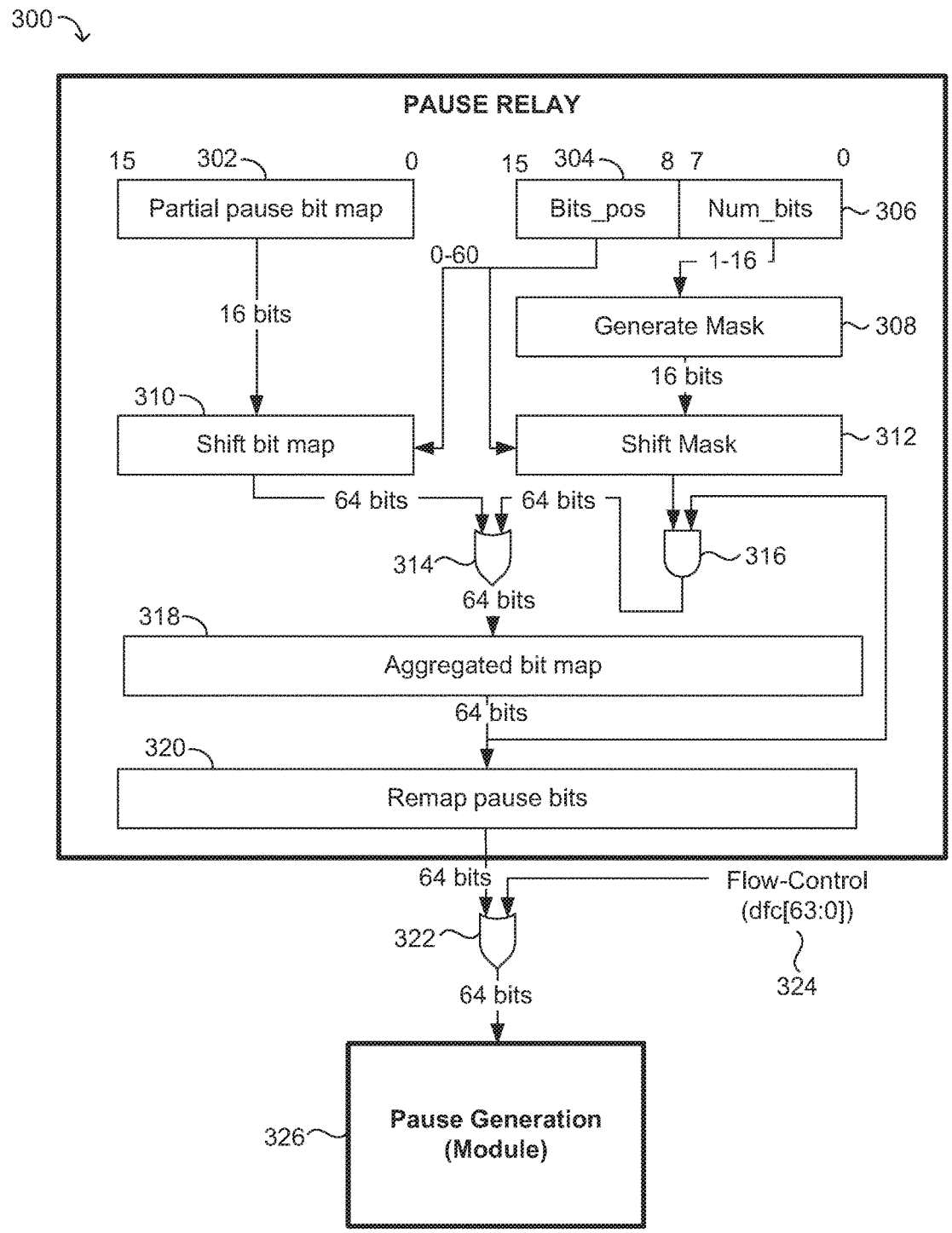
FIG. 8 is a schematic diagram showing the pause relay module, constructed and operative in accordance with embodiments of the disclosed technique.

To further detail the internal component structure of the multi-port DFE processors, their configuration and operation, reference is now further made to FIGS. 7A, 7B, 7C, 7D and 8. FIG. 7A is a schematic diagram that shows a practical implementation of the relay architecture, constructed and operative in accordance with embodiments of the disclosed technique. FIG. 7B is a schematic illustration of the relay architecture of FIG. 7A further showing a downstream data path toward the subscriber side. FIG. 7C is a schematic illustration of the relay architecture of FIG. 7A further showing an upstream data path toward the network side. FIG. 7D is a schematic illustration of the relay architecture of FIG. 7A further showing a data path, path, typically used for the communication of management data between processors. FIG. 8 a schematic diagram showing the pause relay module, constructed and operative in accordance with embodiments of the disclosed technique. FIG. 7A shows the internal architecture (i.e., components, interconnections, and data paths) of a multi-port DFE processor according to the disclosed technique. Specifically, FIG. 7 shows two multi-port DFE processors ("chips") $200_1$ and $200_2$ of FIG. 6, wherein chip $200_1$ is detailed in greater detail (i.e., in comparison to chip $200_2$) although, the internal architecture and principles apply likewise to chip $200_2$ (i.e., the following chip in the cascade or chain, as well as to other chips (not shown)). Multi-port DFE processor $200_1$ includes a main EB $202_1$, a relay. EB $204_1$, and a serializer/deserializer (referred herein interchangeably as "SERDES" or "SerDes"). Main EB $202_1$ includes a media access controller (MAC) $250_1$ (also denoted as "MAC layer" or "MAC layer block") and a PCS block $252_1$. Relay EB $204_1$ includes a MAC block $254_1$, a PCS block $256_1$ and a multiplexer (MUX) $258_1$. Further shown in FIG. 7A are SERDES $260_2$ in multi-port DFE processor $200_2$ (as well as ellipses that signify that there are components not shown that are parallel to those of multi-port DFE processor $200_1$).

MAC $250_1$ is interconnected with PCS block $252_1$ via connections $264_1$ (i.e., that typically employs the 10 Gigabit media independent interface (XGMII) standard), $266_1$ (i.e., that typically employs the 2.5 Gigabit GMI standard and $268_1$ (i.e., that typically employs the 2.5 Gigabit GMII standard). MAC $254_1$ is interconnected with PCS block $256_1$ via connection $274_1$. PCS block $256_1$ is interconnected with (an input of) MUX $258_1$ via connection $276_1$ ("LANE0"), PCS $252_1$ is interconnected with MUX $258_1$ (as input) via connection $272_1$ ("LANE1"). The output of MUX $258_1$ is interconnected with SERDES $260_1$ via connection $282_1$ ("LANE1"). SERDES $260_1$ is further interconnected with PCS $256_1$ via connection $278_1$ ("LANE1"). PCS $252_1$ and SERDES $260_1$ are interconnected via connection $280_1$ ("LANE0,2,3"). SERDES $260_1$ is further connected with a switch network processor 262 (e.g., operationally similar to Ethernet Switch 104 or ONT 102, shown in FIG. 2) via a plurality of lanes (denoted "LANE0", "LANE1", "LANE2", and "LANE3"), as well as with SERDES $260_2$ of multiport DFE processor $200_2$ via connection $284_1$ ("LANE1").

MAC s $250_1$ and $254_1$ are configured and operative to interface between the network physical layer (PHY) (not shown) and a logical link control sub-layer (not shown). PCSs $252_1$ and $256_1$ are generally configured and operative to interface between the GMII and the physical medium attachment (PMA) sub-layer and to execute and allow for a networking protocol sub-layer (e.g., 10 Gigabit, Fast Ethernet, gigabit Ethernet). MUX $258_1$ is configured and operative to multiplex between data entering from "LANE0" or "LANE1" and to output data from either one of those lanes. SERDES $260_1$ is configured and operative to serialize data (i.e., transform input digital data into an output serial data stream), as well as to deserialize data (i.e., transform an input serial data stream into a digital data output).

To elucidate the various paths in which payload data as well as configuration data are propagated through, the relay architecture shown in FIG. 7 in accordance with the disclosed technique, reference is now further made to FIGS. 7B, 7C, and 7D. FIG. 7B is a schematic illustration of the relay architecture of FIG. 7A further showing a downstream data path toward the subscriber side. FIG. 7C is a schematic Illustration of the relay architecture of FIG. A further showing an upstream data path toward the network side. FIG. 7D is a schematic illustration of the relay architecture of FIG. 7A further showing a data management path.

With reference to FIG. 7B, the data path it the downstream direction, from switch 262 toward multi-port DFE processor $200_1$ (end toward one the subscriber side) is shown as a dotted line 290. Specifically, the data from the external host (network side) is conveyed from switch 262 through LANE0 toward SERDES $260_1$, which in turn conveys the data via connection $280_1$ to PCS $252_1$, which in turn conveys the data through connection $268_1$ to MAC $250_1$ and through connection $270_1$ to PCS $256_1$ of relay EB $204_1$. PCS $256_1$ conveys the data through connection $276_1$ (LANE0) toward MUX $268_1$, which in turn conveys the data back to SERDES $260_1$, which in turn conveys the data to SERDES $260_2$ of next chip in the chain or cascade (i.e., multi-port DFE processor $200_2$) via connection $284_1$ (that is coupled with LANE1).

In the upstream direction, with reference to FIG. 7C, the data path from at least one subscriber (e.g., one of which is connected to multi-port DFE processor $200_2$) toward the external host (network side) relayed through multi-port DFE processor $200_1$ is shown as a dotted line 292. Specifically, the data is conveyed from SERDES $260_2$ via connection $284_1$ (LANE1) toward SERDES $260_1$ of multi-port DFE processor $200_1$. SERDES $260_1$ conveys the data toward PCS $256_1$ of relay EB $204_1$, via connection $278_1$ ("LANE1"). PCS $256_1$ conveys the data toward MAC $254_1$, which in turn conveys the data toward MAC $250_1$ of main EB $202_1$ (via logic that copies the output from one MAC to the input of another MAC (or vice-versa)). MAC $250_1$ conveys the data to PCS $252_1$ via connection $266_1$, which in turn coveys the data to SERDES $260_1$ via connection $280_1$ (LANE0), SERDES 260 conveys the data to switch 262 via LANE0.

With reference to FIG. 7D, a data path, typically used for communicating management data between processors, denoted by a dotted line 294, is shown. This data path (also denoted herein as "management data path") is normally used for the communication of management data originating internally (e.g., a central processing unit (CPU) within a processor (e.g., $200_1$)) between processors (e.g., $200_1$ and $200_2$). Specifically, FIG. 7D shows an internal path 294 (denoted by dotted line) of management data (as opposed to payload data) traversed from one multi-port DFE processor $200_1$ toward the next chip in the chain, namely multi-port DFE processor $200_2$. The management data may be a message in the form of a packet (e.g., a control packet—not shown) that specifies configuration data, and the like. MAC $250_1$ of main EB $202_1$ conveys the management data toward PCS $252_1$ via connection $268_1$ (employing the GMII 2.5G standard), which in turn conveys the management data toward MUX $258_1$ of relay EB $204_1$ via connection $272_1$. MUX $248_1$ conveys the management data toward SERDES $260_1$ via connection $282_1$. SERDES $260_1$ conveys the management data toward SERDES $260_2$ via connection $284_1$ (LANE1).

Reference is now made to FIG. 8, which is a schematic diagram showing a pause relay module, generally referenced 300, constructed and operative in accordance with embodiments of the disclosed technique. The following description describes the problem with handling G.999.1 PAUSE frames in the "relay" chain implementation of the disclosed technique and a proposed solution. Firstly, some explanations on the structure of the G.999.1 PAUSE frame. The G.999.1 PAUSE frame has a similar structure and function to Ethernet PAUSE frames except that it is also able to apply flow-control selectively to traffic destined for a specific subscriber stream (i.e., or set of subscriber streams) rather than collectively starting or stopping all traffic entering the Ethernet port as is the case for Ethernet. The G.999.1 PAUSE frame achieves this by identifying the exact set of streams (i.e., virtual subscriber ports) on which flow-control should be applied or de-applied. The set of streams is described as a bit map contained within the Ethernet PAUSE frame body. The "relay" solution of the disclosed technique is intended to make a chain of relay chips (i.e. the relay EBs of each of processors $104_1$, $104_2$, etc.) appear like (i.e., function as) a single chip that supports a larger number of ports (e.g., 64 ports). In order to achieve this target the G.999.1 PAUSE frame that is sent to the external host (by the subscriber side) must reflect the aggregate flow-control state of all streams within all of the chips (i.e., multi-port DFE processors, as shown, for example, in FIGS. 2 and 4) in the relay chain configuration. Note that it is not sufficient that each chip send its own G.999.1 PAUSE frame that only reflects the flow-control state of its respective local streams since this will incorrectly reflect the flow-control state of the non-local streams and may be in conflict with the actual flow-control state. To reflect the flow-control state of the entire chip (global flow-control state), the following approach is defined. Each chip in the chain is responsible for maintaining the flow-control state of its local stream. Each chip generates its own respective "local" PAUSE data that is relayed through the chip cascade configuration. The flow-control information is communicated up in the hierarchy of the relay chain configuration (i.e., toward the first chip) in a "local" PAUSE frame message that is transparently forwarded by each chip in the chain up to the head of the chain. Specifically, the local PAUSE frame is communicated in-band on the Ethernet link (connection). The PAUSE bits are encoded in the local PAUSE frame message. The PAUSE message is generated by the first chip (e.g., multi-port DFE processor $158_1$ in FIG. 4) in the chain configuration (also denoted herein interchangeably as "top chip", "topmost chip", "chief chip"). This first chip is configured and operative to aggregate the local PAUSE data from all of the other chips (processors) in the chain configuration (cascade) (e.g., multi-port DFE processors $158_2$, $158_2$, and $158_3$), as well as its own local PAUSE data. The first chip is further configured and operative to output a standardized (G.999.1) global PAUSE message that contains local PAUSE data of each chip in the relay chain configuration. Generally, each of the chips (multi-port DFE processors, e.g., $158_1$, $158_2$, $158_3$, and 158₄) in the chain configuration is identical to each other in the chain configuration is identical to each other in terms of hardware ("hardware-equivalent"), wherein the aggregation functionality of the first chip may be realized by firmware, software configuration, and the like. Alternatively, all chips in the chain configuration are identical to each other in terms of hardware, apart from the first chip in the chain configuration (not shown). Each local PAUSE frame contains at least the following information:

1. The flow-control state of the local stream in the chip represented by a bit map.
2. The number of active streams (bits) in the bit map of the local chip.
3. The bit positions within an aggregate flow-control register where the local flow-control bit map should be located.

The first or top chip aggregates the local PAUSE frames from all chips and combines it with the local flow-control state of its own local streams. Specifically, with reference to FIG. 8, the PAUSE relay (module) includes the following functional blocks: a partial pause bit map block 302, a bits position and bit number blocks 304 and 306 (respectively), a mask generator 308, a bit map shifter 310, a mask shifter 312, a logic OR gate 314, a logic AND gate 316, an bit map aggregator 318, and a pause bits re-mapper 320. Further shown in FIG. 8 are a logic OR gate 322 and a pause generation module 326. Partial pause bit map block 302 is configured and operative to generate a partial (non-aggregated) local bit map pertaining to the flow-control state of the local data streams flowing through the first (top) chip the chain configuration. The bit position and bit number blocks 304 and 306 represent the number of bits that are relevant for the aggregated pause relay function (e.g., for only 4-ports there are only 4 relevant bits). The bit position ("bit_pos") in bit position block 304 represents the offset of the local bit map from an aggregate bit map. According to an example implementation, the pause bit map of a relaying chip is encoded into the inner VLAN (virtual local access network) tag field of the pause relay packet. According to the disclosed technique, into the outer VLAN, the number of active streams in the message ("num_bits") is encoded as well as the position of these bits (i.e., where these bits should be placed ("bits_pos")) into the 64 bits register that aggregates the pause messages received from all relayed chips).

Mask generator 308 is configured and operative to generate a mask of the relevant bits in the local partial PAUSE frame bit map in a 64-bit wide bit map. Mask shifter 312 is configured and operative to shift the bits in the generated local mask to their respective position within the 64-bit wide bit map, as well as inverting the value. This operation generates a 64-bit mask with bits set at every bit position except for the bit positions that correlate to the local partial bit map. Logic AND gate 316 performs a Boolean "AND" operation on the current value of the aggregated bit map together with the shift mask (i.e., generated by mask generator 308), so as to output a 64-bit wide output that includes all the bit values in the aggregated bit map, except for the respective bits in the partial bit map (i.e., effectively resetting the bit values of these local bit positions).

Bit map shifter 310 is configured and operative to receive a 16-bit partial bit map data from partial pause bit map block 302 and to output a shifted bit map that is mapped to 64-bits. The offset that is used by bit map shifter 310 is determined by bit position block 304. Logic OR gate "OR's" (i.e., by applying the Boolean "OR" operation) the data received and outputted from bit map shifter 310 as well as from logic AND gate 316 together so as to produce a new (updated) aggregated 64-bit wide bit map. This new updated 64-bit aggregated bit map is then converted into an aggregate standard G.999.1 PAUSE frame that reflects the (global) flow-control state (or aggregated flow-control state) of all streams in the chain of chips. Specifically, bit map aggregator 318 is configured and operative to generate a 64-bit aggregated bit map that includes data that pertains to the partial bit map information of each of the respective chips in the chain (not including the first chip). Pause bit re-mappers 320 is configured and operative to re-map any of the 64 bits in the bit map received from bit map aggregator 318 and to output a re-mapped bit map of necessary), also termed herein as "output bit map". The remapping function of the pause bits re-mapper 320 is based on a configurable recap table, which may also be used (i.e., optionally) to map each of the 64 input bits to one of the 64 outputs bits. Logic OR gate 322 ORs (i.e., performs the Boolean "OR" operation) the output bit map with the local flow-control 324 signals and generates an output that is conveyed to pause (packet) generation module 326; which in turn generates a standardized PAUSE packet that aggregates the local pause information from each chip in the cascade into a consolidated form.

It will be appreciated by persons skilled in the art that the disclosed technique is not limited to what has been particularly shown and described hereinabove. Rather the scope of the disclosed technique is defined only by the claims, which follow.

The invention claimed is:

1. A multi port access node for communicating data to and fro a plurality of transceiver units via a plurality of respective communication lines, the multi port access node comprising:
a plurality of processors forming a cascade configuration defining a first processor, each processor includes a main communication unit, said main communication unit includes a network side port, said processor includes at least one line side port associated with a respective one of said communication lines, at least one of said processors further includes a relay unit having a relay port, said relay unit is coupled with said main communication unit of the same said processor, said relay port is coupled with at least one said network side port of at least one different said processor, wherein said first processor is configured to aggregate a flow control state associated with each of said processors in said cascade configuration, and to generate its respective local PAUSE data, wherein said relay unit is configured to relay at least part of said data in at least one of a downstream direction destined toward at least one of said transceiver units, and an upstream direction arriving from at least one of said transceiver units.

2. The multi port access node according to claim 1, wherein said relay unit is configured to relay said data to said main communication unit located within the same said processor.

3. The multi port access node according to claim 1, wherein said relay unit is configured to relay said data to said main communication unit of said at least one different said processor.

4. The multi-port access node according to claim 1, wherein said network side port, of at least one of said processors that includes said relay unit, is configured for coupling with and external host.

5. The multi port access node according to claim 4, wherein successive coupling between said processors forms at least one cascaded relay configuration, where said first processor is configured to be coupled with said external host is within its respective said at least one cascaded relay configuration.

6. The multi port access node according to claim 5, wherein a last said processor in said cascaded relay configuration drops said data that is not destined to any of said at least one line side ports.

7. The multi port access node according to claim 5, wherein in said upstream direction, said data said arriving from said transceiver units are aggregated by each said processor in said cascaded relay configuration.

8. The multi port access node according to claim 5, wherein each said processor is configured to generate its own respective local PAUSE data that is relayed through said cascade configuration.

9. The multi port access node according to claim 8, wherein said flow control state is communicated along said at least one cascaded relay configuration, through a respective local PAUSE frame message.

10. The multi port access node according to claim 9, wherein said first processor is configured to generate a global PAUSE message from every said respective local PAUSE frame message.

11. The multi port access node according to claim 10, wherein said first processor further combines its corresponding said flow control state with said flow control state corresponding to the remaining said processors into an aggregated flow control state.

12. The multi port access node according to claim 11, wherein said first processor is configured to output a standardized PAUSE message that contains aggregated data pertaining to individual said flow control state associated with each of said processors.

13. The multi port access node according to claim 9, wherein said local PAUSE frame contains at least one of the following information:
   said flow control state of local data streams in said processor, that is represented by a bit map;
   a number of active said local data streams in said bit map of said processor; and
   bit positions within an aggregate flow control register indicating where a local flow control bit map is located.

14. The multi port access node according to claim 1, wherein said processors exchange with each other precoding data used for vectoring, via a vectoring bus.

15. The multi port access node according to claim 1, wherein said processor relays at least part of said data that is not destined toward its own said at least one line side port, toward said at least one different said processor.

16. The multi port access node according to claim 1, wherein in said downstream direction, different parts of said data are relayed to different respective said transceiver units.

17. The multi port access node according to claim 1, wherein said main communication unit of said processor conveys a back pressure signal toward said relay unit of said at least one different said processor, wherein said backpressure signal carries information pertaining to the capability of said main communication unit to receive further said data.

18. The multi port access node according to claim 1, wherein said main communication unit inspects said data received on its respective said network side port, and filters said data not destined to its respective said at least one line side port.

19. The multi port access node according to claim 1, wherein said main communication unit includes a main media access controller (MAC) and a main physical coding sub layer (PCS) block that are coupled with each other.

20. The multi port access node according to claim 19, wherein said relay unit includes a relay MAC, a relay PCS block, a serializer/deserializer (SERDES), and a multiplexer, said relay MAC is coupled with said relay PCS block, said relay PCS block is coupled with said multiplexer, and said SERDES is coupled with said multiplexer, said main PCS block and with said relay PCS block.

21. The multi port access node according to claim 20, wherein said SERDES of said processor is coupled with said SERDES of said at least one different said processor.

22. The multi port access node according to claim 21, wherein in said downstream direction, said at least part of said data traverses at least part of a downstream path defined from an external host, via said SERDES, via said main PCS block, via said main MAC, via said relay PCS block, via said multiplexer, and via said SERDES again.

23. The multi port access node according to claim 21, wherein in said upstream direction, said at least part of said data traverses at least part of an upstream path defined from said at least one of said transceiver units, toward said SERDES, via said relay PCS block, via said relay MAC, via said main MAC, via said main PCS block, via said SERDES again.

24. The multi port access node according to claim 21, wherein management data is communicated from said processor to said at least one different processor.

* * * * *